United States Patent
Biehler

(10) Patent No.: US 8,433,827 B2
(45) Date of Patent: Apr. 30, 2013

(54) METHOD FOR CONFIGURING FIELDBUS STATIONS

(75) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 13/210,924

(22) Filed: Aug. 16, 2011

(65) Prior Publication Data

US 2012/0041571 A1 Feb. 16, 2012

(30) Foreign Application Priority Data

Aug. 16, 2010 (EP) ..................................... 10172884

(51) Int. Cl.
*G06F 3/00* (2006.01)
*G06F 13/00* (2006.01)

(52) U.S. Cl.
USPC ........... 710/3; 710/5; 710/8; 710/15; 710/300

(58) Field of Classification Search .................... None
See application file for complete search history.

(56) References Cited

U.S. PATENT DOCUMENTS

2009/0228611 A1 * 9/2009 Ferguson et al. ................. 710/8

FOREIGN PATENT DOCUMENTS

| DE | 10 2006 027683 | 12/2007 |
|---|---|---|
| EP | 0 932 278 | 7/1999 |
| EP | 2 110 725 | 10/2009 |
| WO | WO 2007/144364 | 12/2007 |

* cited by examiner

*Primary Examiner* — Scott Sun
(74) *Attorney, Agent, or Firm* — Cozen O'Connor

(57) ABSTRACT

A method for configuring fieldbus stations, wherein station names and addresses for the fieldbus stations are executed by reading in a parameter over a first network port of a coupling element, which acts as a topology anchor so as to assign a unique addressing in a subnetwork, i.e., a unique name and a unique IP address, in a PROFINET-IO, such as a fieldbus based on Ethernet.

11 Claims, 2 Drawing Sheets

METHOD FOR CONFIGURING FIELDBUS STATIONS

BACKGROUND OF THE INVENTION

1. Field of the Invention

The invention relates to a fieldbus stations and, more particularly, to a method for configuring fieldbus stations in a subnetwork.

2. Description of the Related Art

Preferably, networks and fieldbus stations are used, for example, in process automation for the industrial automation of production systems. A known fieldbus is a PROFINET-IO bus, which is based on Ethernet technology. Such a PROFINET-IO bus requires a unique name and a unique IP address for each fieldbus station for addressing in its network, as well as in its subnetworks. If a system operator or planner has configured a system setup consisting of a plurality of fieldbus stations, and has written a control program for this system setup, this control program and the system setup are generally provided with unique addresses. This configuration or control program embodied in this way can be used in a fieldbus based on Ethernet technology. However, the configuration or control program can only be used precisely once due to the addressing scheme. If, however, a series machine manufacturer, for example, manufactures a machine type for a particular system setup, several instances of the identical type of which are to be used within a subnetwork by an end customer, for example, the uniqueness of the names and IP addresses must be ensured when the entire system is commissioned on site.

In accordance with the current state of knowledge, the uniqueness of the names and IP addresses is achieved in that a system startup engineer for the individual system setups or in each instances provides the individual fieldbus stations on site with a unique name and adapts the configuration or the control program, which is loaded onto an IO controller, to the unique name. The system startup engineer also sets unique IP addresses in the configuration. Thus, the problem arises that the system startup engineer must have access to the configuration or the control program and must laboriously modify the configuration or the control program on site for each individual system setup.

SUMMARY OF THE INVENTION

It is therefore an object of the invention to provide a method for configuring fieldbus stations that simplifies the work of a startup engineer.

This and other objects and advantages are achieved by a method for configuring fieldbus stations in a subnetwork, wherein the method comprises forming a first system setup from fieldbus stations of a first subnetwork, providing a first fieldbus station of the first subnetwork with an executable user program, establishing rules in the first system setup, starting the first fieldbus station and executing the user executable program, and executing a sequence in the user executable program.

In accordance with the invention, it is advantageous for a system setup to be formed from fieldbus stations of a first subnetwork, where a first station of the first subnetwork is furnished with an executable user program. It also advantageous for the reference point to be defined, with address data for configuring the fieldbus stations being derived from this reference point.

In an embodiment, the reference point is selected as a storage area in an interface of the first fieldbus station, and by using a configuration tool the data record is written in this reference point with data for the reference name and reference address.

In another embodiment, the reference point is defined as a storage area in an interface of a coupling element, and the first fieldbus station is connected to a first port of the coupling element using a first network port, where subsequent to performing a connection procedure an item of data for a mounting position of the first system setup is read out from the storage area.

Here, the first fieldbus station is connected to a first port of a coupling element using a first network port. Such a system setup is generally effected by configuring with a special configuration tool, as is known, for example, from the company Siemens under the brand name SIMATIC Step 7. Electronic datasheets for the connected fieldbus stations, i.e., PROFINET-IO devices, are required for a configuration. These electronic datasheets are also called Generic Station Description (GSD) files. Each PROFINET-IO device requires an individual GSD file, which must be made available by the respective device manufacturer. When configuring the PROFINET network, a planner selects the modules/submodules defined in the GSD file to map the selected modules/submodules to the real system and assign these modules/submodules to the respective mounting locations.

The following rules are established for execution of the method, preferably in the first system setup. Here, the first port is established/defined as a first reference point from which address data for configuring the fieldbus stations in the first subnetwork is derived, a setting is chosen for a station name and an address of the fieldbus stations indicating which address data will be assigned at a later point in time, and further fieldbus stations are temporarily set, with an exception of the first fieldbus station, as deactivated.

The following sequence is run in the user program of the first fieldbus station. Here, a data record of the first port of a coupling element in an interface or of the storage area of the first fieldbus station is read in over the first network port from the reference point, where a reference name and a reference address is determined by the data record. The station names and the station addresses for the fieldbus station are derived from the reference name and the reference address, invoking a system function in the user executable program that writes the derived station names and station addresses to a configuration file. All of the previously deactivated fieldbus stations are now re-activated.

The configuration includes establishing the station names and the addresses, i.e., the network IP's. Here, each field device is assigned a logical name that should have a reference to the function in the system or to the mounting location and finally during address resolution results in the allocation of an IP address. This allocation of the IP address is, however, set so that the address data is not assigned until a later point in time. This setting would correspond, for example, to a setting type as in a following parameter set; Name_of_Station "assign on site". Consequently, the name of the station is assigned dynamically.

By reading in the first data record, where a reference name and a reference address are determined by the data record, unique station names and station addresses can be derived for the fieldbus stations.

After a PROFINET configuration is completed, a planner normally loads the configuration data into a input/output (I/O) controller. The I/O controller thereby has all information for addressing I/O devices and for performing data exchanges. Following the successful download, the I/O controller starts to boot up the PROFINET-IO subnetwork.

In accordance with the method of the invention, a download by the planner is advantageously no longer necessary, because invoking a system function in the user program that writes the derived station names and station addresses to a configuration file replaces this previously manually executed step. After writing to the configuration file, all previously deactivated fieldbus stations are activated.

In accordance with the method of the invention, it is advantageous to operate the first fieldbus station as an automation device with a programmable logic controller and to store a program that controls a system in the first fieldbus station. Such fieldbus stations are called intelligent decentralized peripherals. I/O assemblies that can record and emit signals from the process are generally connected to such fieldbus stations, with the fieldbus station having its own CPU to assume control tasks.

Here, the first system setup, which contains a plurality of fieldbus stations, is preferably connected to the coupling element that forms a topology anchor for the topology of the subnetworks. The coupling element can have a plurality of interfaces, where each interface is assigned a unique item of data for a unique mounting position.

When establishing the above-described rules, it is also advantageous if a namespace and an address band, i.e., for a fieldbus network based on an Ethernet-TCP/IP, is established previously. Such a namespace can, for example, consist of an identifier "_001", which symbolizes the first system setup. Here, the identifier "_001" is simply appended to existing names such as CPU, function device or ET200, to form unique names. A unique name assignment is thus guaranteed. An exemplary address band, i.e., an IP band, can consist of the first eight digits of an IP address. An IP band of "142.160.2.1X" would thus be conceivable, in which any number from zero to nine is used for the X and can be incremented depending on the number of fieldbus stations.

In a further advantageous embodiment, during a system bootup of the first fieldbus station, a check is made therein to determine to which port of the coupling element it is connected using its first network port. If a coupling element, such as a switch, has a plurality of ports, then these ports are in a straightforward case numbered consecutively, such as Port-001, Port-002 or Port-003. After its system bootup, a user program in the first fieldbus station can request this consecutively numbered port name, such as Switch1.Port-001, through its first network port from the coupling element, i.e., from the switch, and by using this interrogation value the user program can accordingly continue to operate. This could be effected, for example, with a List Layer Discovery Protocol (LLDP).

Preferably, this interrogation is executed as an interrogation of a data record, where a parameter obtained from the data record of the first port and a unique station name for a fieldbus station is derived from this parameter and the namespace, and where a unique station address is derived from the parameter and the address band. In principle, any parameter that permits the unique formation of the station name and the station address to be derived can be obtained from the data record. This can be, for example, the port number "Port_001" of a first switch, i.e., Switch1.Port_001="Port_001".

Preferably, the program is configured for a machine type and the first system setup is likewise configured for this machine type, where the program is used for further system setups in which the same machine type is used. Using the disclosed embodiments of the method, the program that is configured a single time for a specific type of machine can be dynamically adapted to unique station names and station addresses during bootup of the individual field devices, without which a startup engineer must manually adapt the corresponding station names and station addresses by using the port of a programming device.

Here, it is advantageous for the further system setups to be linked to the coupling element and for a unique station address and a unique station name to be produced for each fieldbus station after execution in accordance with the disclosed embodiments of the method, after which the system setups can commence their system operation trouble-free.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other advantages, features, and specifics of the invention emerge from the exemplary embodiment described below as well as with the aid of the drawings, in which.

DETAILED DESCRIPTION OF THE PRESENTLY EMBODIMENTS

Figure 1:
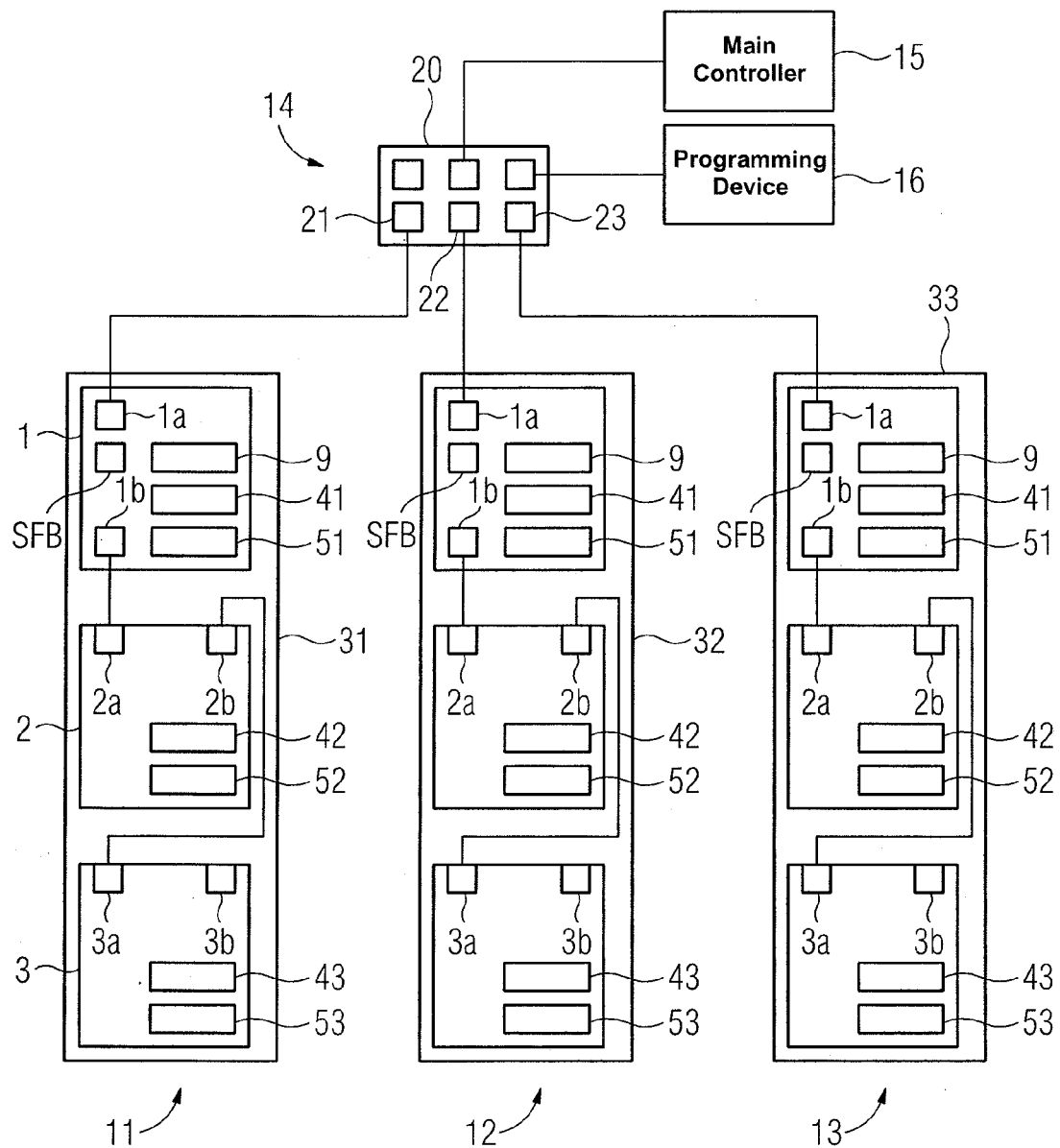
FIG. 1 is an exemplary schematic block diagram of an industrial system in which the method in accordance with an embodiment of the invention is implemented.

FIG. 1 shows an industrial system with a first system setup 31, a second system setup 32 and a third system setup 33 represented schematically. The system setups 31,32,33 are linked by a higher-level network 14 with a coupling element 20 to a main controller 15 and to a programming device 16. In addition to the ports for the main controller 15 and the programming device 16, the coupling element 20 has a first port 21 to which the first system setup 31 is connected by a fieldbus line, a second port 22 to which the second system setup 32 is connected by a fieldbus line, and a third port 23 to which the third system setup 33 is likewise connected by a fieldbus line. Here, the fieldbus lines are each configured as an Industrial Ethernet, PROFINET-IO.

The individual system setups 31,32,33, with their field devices 1,2,3, are each configured for a particular type of machine. Here, the first system setup 31 has, for example, a first fieldbus station 1, a second fieldbus station 2 and a third fieldbus station 3. The setup of the first system setup 31 applies correspondingly for the system setups 32,33 and will be explained using only the example of the first system setup 31.

The fieldbus stations 1,2,3 are likewise networked by fieldbus lines and thus form a first station network 11. The first fieldbus station 1 is connected to the first port 21 of the coupling element 20 through a first network port 1a associated with fieldbus station 1. As a special fieldbus station, the first fieldbus station 1 is configured as an intelligent decentralized peripheral with an integrated programmable logic controller and thus a CPU. A user program 9 is thus capable of running in the first fieldbus station 1 and can assume control tasks. The first fieldbus station 1 is connected to the second fieldbus station 2 through a second network port 1b, where the second fieldbus station 2 considered in isolation likewise provides a first network port 2a and a second network port 2b. A third network station 3 is likewise connected to its first network port 3a through the second network port 2b of the second network station 2. A second network port 3b of the third network station 3 remains free (i.e., unconnected).

For a subsequent assignment of a unique station name and an address for the network stations 1,2,3, the first port 21 is established as a first reference point from which address data for configuring the fieldbus stations 1,2,3 in the first subnetwork 11 is derived. Here, a setting is selected in a method step for a first station name 41 and a first address 51 of the first fieldbus station 1 that indicates that the address data is assigned at a later point in time. Such a setting is, for example, possible by use of a configuration tool. A possible setting for the first fieldbus station 1 with a CPU would then be: NameofStation="Assign on site" and IP Suite likewise corresponds to "Assign on site". The setting also applies for the second fieldbus station 2 and the third fieldbus station 3. Moreover, with the exception of the first fieldbus station 1, the further fieldbus stations 2,3 are temporarily set to deactivated.

In order to commence assigning a name and an address for each fieldbus station 1,2,3, the following sequence is executed in the user program 9: a data record for the first port 21 of the coupling element 20 is read in over the first network port 1a of the first network station 1, where a reference name and a reference address are determined with the use of the data record. The coupling element 20, which is configured as a switch and acts as a topology anchor could, for example, possess the names "Port_001, Port_002, Port_003" for its ports 21,22,23. Unique station names and station addresses for the fieldbus stations 1,2,3 can be derived from these parameters of the coupling element 20. If these station names and station addresses are provided within the user program 9, i.e., in a runtime functionality in the CPU, for example, by string operations, then an invocation of a system function SFB can furthermore be performed within the user program 9, and this system function SFB writes the derived names and addresses to a configuration file. On conclusion of the system function SFB, all previously deactivated fieldbus stations are re-activated. The system function SFB, for example, has written the address data to the corresponding I/O controllers of the corresponding fieldbus stations. As a result, a bootup of the first system setup 31 can be performed.

Under the assumption that the system setups 31,32,33 are identically configured and that in each case the first fieldbus station 1 forms a programmable logic controller with a CPU, each CPU forms a machine instance of the identical type. Here, an identical automation configuration is stored for every CPU. The parameters "Name of Station" and the IP page are set to "Assign on site" in the automation configuration.

In this multi-computer system, the switch forms the topology anchor. The user has previously established that the individual machine instance is given the namespace as a function of the port number of the switch, i.e., the machine at "Port_001" is given the namespace "_001", the machine at port_002 the namespace "_002", and the like. Moreover, it is advantageous for the machine instance at port_001 to have IP addresses that end in "1X", and those at port_002 the IP addresses that end in "2X", etc.

If a CPU starts up, it checks what port in the topology it is connected to. After requesting a parameter from the topology anchor, e.g., "Port_003.Switch", the user program can deduce from this in the CPU that the namespace "_003" and the IP address range "3X" are assigned here. Thus, the CPU can fill the configuration file with the help of the user program 9 and the system function SFB. Here, the configuration file comprises, for example, an IP configuration data record. The following values are entered in this IP configuration data record:

For the CPU: NameofStation=CPU_003, IP=142.160.2.30
For the IO devices:
NameofStation=FR_003, IP=142.160.2.31, StationNameAlias=port-002.CPU_003
NameofStation=ET200_003, IP=142.160.2.32, StationNameAlias=port-002.FU_003

After the system function SFB is invoked, the aforementioned values are directly entered into an interface of each CPU, and the values for the IO_Devices are entered into a database of the IO controller. When a user then activates the IO devices, i.e., the fieldbus stations, a search is performed for the name and also the StationNameAlias. If a StationNameAlias with a different or else unset NameofStation is found, the NameofStation is set by the mechanisms of device replacement without PG, i.e., based on the topology. For the mechanisms of device replacement without PG, reference is made to European patent application EP 2 110 725 A1 (publication date Oct. 10, 2009) for the executability of the exemplary embodiment. The NameofStation is entered into the first station 41 field for the first fieldbus station 1 and the IP station address is entered into the first address 51 field of the first fieldbus station 1. An analogous entry of name and address applies for the remaining fieldbus stations.

The method in accordance with the disclosed embodiments enables a specific type of machine having a shared configuration to be instanced multiple times in a system and adapted to its surroundings. This adaptation may be achieved by individualizing the CPU itself or by taking account of a mounting position. In the case of the variant involving an individualization of the CPU itself, where CPU corresponds to the first fieldbus station that is configured as a programmable logic controller, the first subnetwork with its fieldbus stations does not yet need to be connected to a coupling element. Here, the reference point, from which address data for configuring the fieldbus stations is derived, is defined in a storage area of an interface of the CPU, i.e., the first fieldbus station. The first subnetwork for the first system setup can thus fully configure and address itself without having to be connected to a coupling element.

When a mounting position is taken into account, the reference point is defined as a storage area in an interface of a coupling element, where the first fieldbus station, i.e., the CPU with a first network port (normally its interface for the fieldbus), is connected to a first port of the coupling element. Following the connection procedure, an item of data for a mounting position of the first system setup is read out from the storage area of the coupling element, normally a switch.

In an exemplary environment, different system setups comprise mobile units which, for example, in a series of printing presses can be pushed forward and docked in the corresponding printing presses. Such mobility is required, for example, in the printing industry to provide different newspapers with different sales or advertising material or complementary CDs.

If thereafter in a printing process a mobile system setup is pushed to a certain position in the printing press process and is docked to a coupling element, this system setup is "woken up". In figurative terms, the system setup is supplied with power, wakes up and asks itself "where have I woken up". In this wakeup phase, the reference point is interrogated in the coupling element based on the disclosed embodiments of the method and thereafter the procedure continues in accordance with the contemplated embodiments of the method with the item of data from the reference point and the system setup for this specific printing press station is configured.

It is thus apparent that it is advantageous that a specialist machine builder can build machine types that can be used on an individualized basis by a system startup engineer without the aid of the configuration, but which in this situation address themselves autonomously with the aid of the user program 9.

Figure 2:
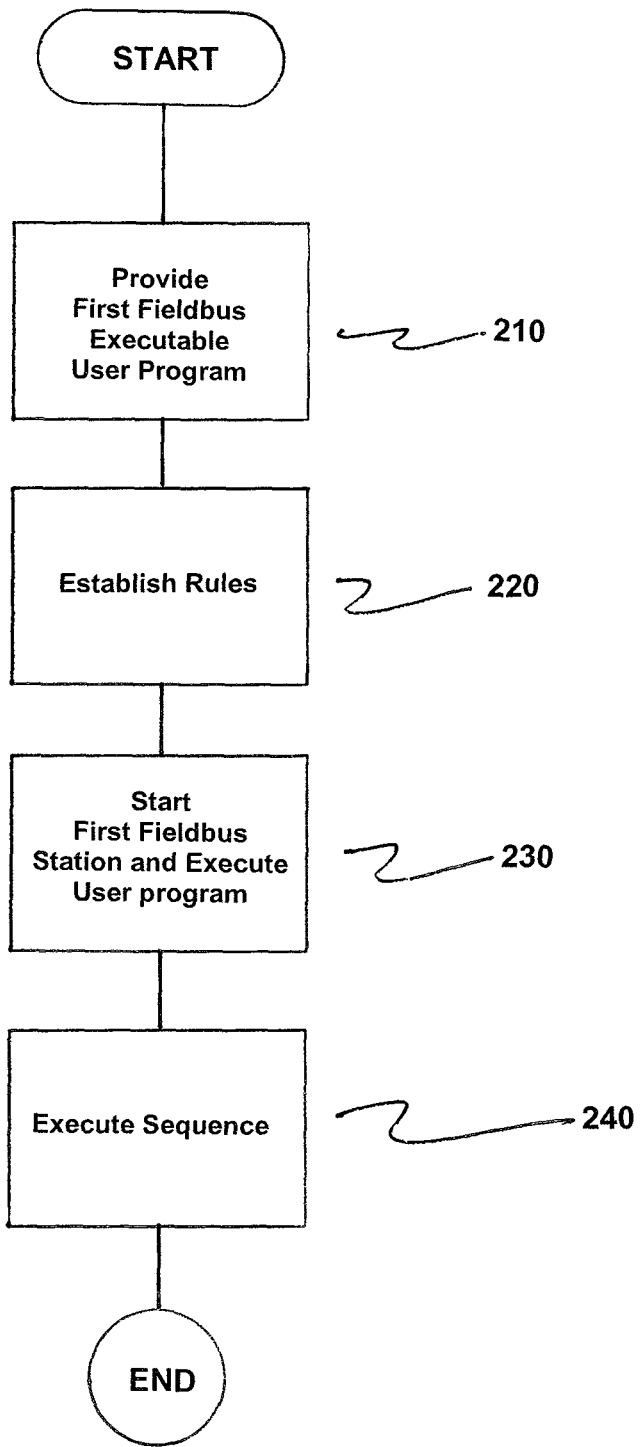
FIG. 2 is a flow chart illustrating the method in accordance with an embodiment of the invention.

FIG. 2 is a method for forming a first system setup from fieldbus stations of a first subnetwork. The method comprises providing a first fieldbus station of the first subnetwork with an executable user program, as indicated in step 210. Rules are established in the first system setup, as indicated in step 220. Here, the rules are established by i) defining a reference point from which address data for configuring the fieldbus stations in the first subnetwork is derived; by ii) choosing a setting for a station name and an address of the fieldbus stations indicating which indicates that address data will be assigned at a later point in time; and by iii) temporarily setting, with an exception of the first fieldbus station, further fieldbus stations, as deactivated.

The first fieldbus station is started and the user executable program is executed, as indicated in step 230. A sequence is executed in the user executable program, as indicated in step 240. Here, the sequence is executed by iv) reading in of a data record from the reference point, a reference name and a reference address being determined by the data record, by v) deriving station names and station addresses for the fieldbus stations from the reference name and the reference address, by vi) invoking a system function in the user executable program which writes the derived station names and station addresses to a configuration file, and by vii) activating all previously deactivated fieldbus stations.

Thus, while there have shown and described and pointed out fundamental novel features of the invention as applied to a preferred embodiment thereof, it will be understood that various omissions and substitutions and changes in the form and details of the devices and/or methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring fieldbus stations in a subnetwork, the method comprising:
    forming a first system setup from fieldbus stations of a first subnetwork;
    providing a first fieldbus station of the first subnetwork with an executable user program;
    establishing rules in the first system setup comprising:
        i) defining a reference point from which address data for configuring the fieldbus stations in the first subnetwork is derived;
        ii) choosing a setting for a station name and an address of the fieldbus stations indicating which address data will be assigned at a later point in time; and
        iii) temporarily setting, with an exception of the first fieldbus station, further fieldbus stations as deactivated;
    starting the first fieldbus station and executing the user executable program; and
    executing a sequence in the user executable program comprising:
        iv) reading in of a data record from the reference point, a reference name and a reference address being determined by the data record;
        v) deriving station names and station addresses for the fieldbus stations from the reference name and the reference address;
        vi) invoking a system function in the user executable program which writes the derived station names and station addresses to a configuration file; and
        vii) activating all previously deactivated fieldbus stations.

2. The method as claimed in claim 1, wherein the reference point comprises a storage area in an interface of the first fieldbus station; and wherein the data record containing data for the reference name and the reference address is pre-written into this storage area with a configuration tool.

3. The method as claimed in claim 1, wherein the reference point is defined as a storage area in an interface of a coupling element, and the first fieldbus station is connected to a first port of the coupling element using a first network port; and wherein an item of data for a mounting position of the first system setup is read out from the storage area subsequent to a connection procedure.

4. The method as claimed in claim 1, wherein the first fieldbus station is operated as an automation device with a programmable logic controller and a program is stored in the first fieldbus station which controls a system.

5. The method as claimed in claim 3, wherein the coupling element forms a topology anchor for the topology of the first subnetwork and further subnetworks; and wherein the coupling element includes a plurality of interfaces each assigned a unique item of data for a unique mounting position.

6. The method as claimed in claim 4, wherein the coupling element forms a topology anchor for the topology of the first subnetwork and further subnetworks; and wherein the coupling element includes a plurality of interfaces each assigned a unique item of data for a unique mounting position.

7. The method as claimed in claim 1, wherein a namespace and an address band is pre-established.

8. The method as claimed in claim 3, wherein a parameter is obtained from the item of data of the storage area of the first port and a unique station name is derived for a fieldbus station from this parameter and the namespace, and a unique station address is derived from the parameter and an address band.

9. The method as claimed in claim 1, wherein the executable user program is configured for a specific type of machine and the first system setup is configured for the specific type of machine, and wherein the executable user program is implemented for further system setups in which an identical type of machine is used.

10. The method as claimed in claim 9, wherein the further system setups are connected to a coupling element and, after execution, a unique address and a unique station name are produced for the fieldbus stations, after which the system setups commence their system operation.

11. The method as claimed in claim 7, wherein the namespace and an address band are pre-established for a fieldbus network based on an Ethernet-Transmission Control Protocol/Internet Protocol (TCP/IP).

* * * * *